US012583261B2

(12) United States Patent
Kmiecik et al.

(10) Patent No.: US 12,583,261 B2
(45) Date of Patent: Mar. 24, 2026

(54) AIRCRAFT TIRE WITH ZONED TREAD

(71) Applicant: The Goodyear Tire & Rubber Company, Akron, OH (US)

(72) Inventors: Frank Anthony Kmiecik, Akron, OH (US); Allen Todd Mathis, Cleveland, OH (US); Bret Herbert Marts, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 17/810,017

(22) Filed: Jun. 30, 2022

(65) Prior Publication Data

US 2023/0060672 A1     Mar. 2, 2023

Related U.S. Application Data

(60) Provisional application No. 63/260,754, filed on Aug. 31, 2021.

(51) Int. Cl.
B60C 11/00          (2006.01)

(52) U.S. Cl.
CPC ...... B60C 11/0041 (2013.01); B60C 11/0008 (2013.01); *B60C 2011/0025* (2013.01); *B60C 2200/02* (2013.01)

(58) Field of Classification Search
CPC .............. B60C 1/0016; B60C 11/0058; B60C 11/0041; B60C 11/0008; B60C 11/00
See application file for complete search history.

(56) References Cited

U.S. PATENT DOCUMENTS

| | | | | |
|---|---|---|---|---|
| 4,385,653 A | * | 5/1983 | Okazaki .................. | B60C 11/18 152/549 |
| 4,683,928 A | * | 8/1987 | Yahagi ................... | B60C 11/00 152/209.5 |
| 6,959,744 B2 | | 11/2005 | Sandstrom et al. | |
| 9,809,058 B2 | | 11/2017 | Meza et al. | |

(Continued)

FOREIGN PATENT DOCUMENTS

| | | | | |
|---|---|---|---|---|
| JP | H09164810 A | * | 6/1997 | ........... B60C 11/005 |
| WO | WO-0026044 A1 | * | 5/2000 | ............... B60C 1/00 |
| WO | 2020247663 A1 | | 12/2020 | |

OTHER PUBLICATIONS

Extended European Search Report for Application No. 22192527.4, dated Jan. 24, 2023.

(Continued)

*Primary Examiner* — Cedrick S Williams
(74) *Attorney, Agent, or Firm* — Katherine A. Smith

(57)          ABSTRACT

The invention provides a pneumatic tire having a tire tread with a ground engaging outer surface. The tread further has a first or central tread zone located on the central or crown portion of the tread and formed of a first rubber compound. Additionally, the tread has a second or shoulder tread zone located axially outward of the first or central tread zone on each lateral end of the tread. The second or shoulder tread zone is formed of a second rubber compound. In one example, the first rubber compound has a G' (at 50% strain) in the range of 1.6 to 1.8 MPa. In another example, the second rubber compound has a G' (at 100% strain) in the range of 800 to 830 KPa.

19 Claims, 5 Drawing Sheets

(56)          References Cited

U.S. PATENT DOCUMENTS

| | | | | |
|---|---|---|---|---|
| 2005/0209370 A1* | 9/2005 | Zhang | ..................... | C08L 21/00 |
| | | | | 523/333 |
| 2008/0066838 A1* | 3/2008 | Zhang | ................... | B60C 1/0016 |
| | | | | 152/209.4 |
| 2008/0146719 A1* | 6/2008 | Yang | ...................... | C08K 3/346 |
| | | | | 524/445 |
| 2014/0107284 A1* | 4/2014 | Nebhani | ................ | C08C 19/20 |
| | | | | 524/572 |
| 2018/0326788 A1 | 11/2018 | Joulin | | |
| 2018/0326790 A1* | 11/2018 | Joulin | ................... | B60C 1/0016 |
| 2021/0122191 A1 | 4/2021 | Misani | | |
| 2022/0332016 A1* | 10/2022 | Kutsovsky | .............. | B29B 7/842 |
| 2023/0271452 A1* | 8/2023 | Ishihara | .............. | B60C 11/0058 |
| | | | | 152/209.5 |

OTHER PUBLICATIONS

Korean Office Action on Application No. 2022-0107792, dated Mar. 29, 2024.
Chinese Office Action for Application No. 202211056426.X, dated Mar. 13, 2025.

* cited by examiner

Y = 2.1676X - 1.6128
$R^2$ = 0.9019

Y = 2.3021X - 1.7435
$R^2$ = 0.8498

SHOULDER WEAR OUTPUT

OG' (50%)    OG' (100%)

G' RELATIVE TO CONTROL

FRICTIONAL ENERGY

—— Constant G' Throughout
—— High G' Zone 30, Low G' Zone 40
—— Low G' Zone 30, High G' Zone 40

AIRCRAFT TIRE WITH ZONED TREAD

FIELD OF THE INVENTION

This invention relates to pneumatic tires, and more par-ticularly, to high-speed heavy load tires such as those used on aircraft.

BACKGROUND OF THE INVENTION

Current tire design drivers for an aircraft tire include designing the tire for high wear resistance. FIG. 2 illustrates a computer simulation of a comprehensive wear model showing the amount from various aircraft activities such as touch down, taxing, turning. The central part of the tire tread has the greatest wear. The outer lateral ends of the tire tread near the shoulder also have high wear. The state of the art of high wear resistant tire treads is to select tread compounds that have high stiffness or high abrasion resistance for improved wear resistance. However, the present inventors have discovered an improved wear resistant tread that is contrary to the state of the art.

SUMMARY OF THE INVENTION

The invention provides in a first aspect a pneumatic tire having a tread with a ground engaging outer surface, the tread having a first tread zone and a second tread zone, wherein the first tread zone includes a central portion of the tread and the second tread zone is located adjacent the first tread zone and on each lateral end of the tread, wherein the first tread zone is formed of a first rubber compound and the second tread zone is formed of a second rubber compound, wherein the first rubber compound has a G' (at 50% strain) in the range of 1.6 to 1.8 MPa.

The invention provides in a second aspect a pneumatic tire having a tread with a ground engaging outer surface, the tread having a first tread zone and a second tread zone, wherein the first tread zone includes a central portion of the tread and the second tread zone is located adjacent the first tread zone and on each lateral end of the tread, wherein the first tread zone is formed of a first rubber compound and the second tread zone is formed of a second rubber compound, wherein the second rubber compound has a G' (at 100% strain) in the range of 800 to 830 KPa.

Definitions

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Cord" means one of the reinforcement strands of which the plies in the tire are comprised.

"Equatorial plane" and "EP" mean the plane perpendicu-lar to the tire's axis of rotation and passing through the center of its tread.

"Ply" means a continuous layer of rubber-coated parallel cords.

"Radial" and "radially" mean directions radially toward or away from the axis of rotation of the tire.

"Radial-ply tire" means a belted or circumferentially restricted pneumatic tire in which the ply cords which extend from bead to bead are laid at cord angles between 65° and 90° with respect to the equatorial plane of the tire.

BRIEF DESCRIPTION OF THE DRAWINGS

The invention will be described by way of example and with reference to the accompanying drawings in which.

DETAILED DESCRIPTION OF THE INVENTION

Figure 1:
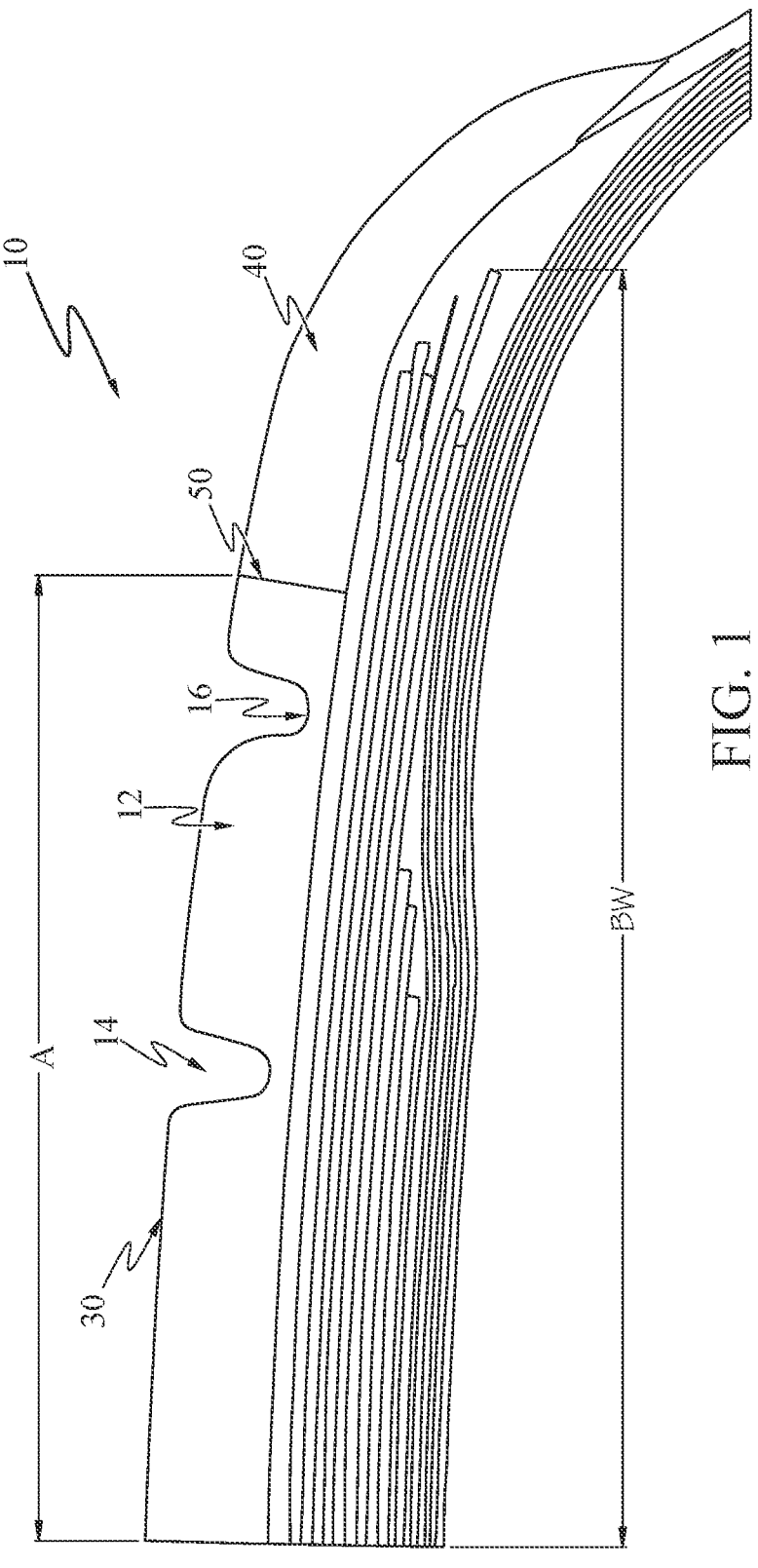
FIG. 1 is a schematic cross-sectional view of a first embodiment of half of a zoned tire tread according to the invention.

FIG. 1 illustrates a cross-sectional view of one half of a pneumatic tire tread 10 of the present invention. The tire is symmetrical about the mid-circumferential plane so that only one half is illustrated. As shown, the tire tread 10 is for an aircraft tire, although the invention is also applicable to other uses such as truck or off the road tires.

The tire tread 10 defines an outer running surface 12 that includes a plurality of grooves 14, 16 separated by tread blocks or ribs. The tire tread 10 is zoned and has a first or central tread zone 30 formed of a first rubber compound and is located on the central or crown portion of the tire tread 10. The tire tread 10 further comprises a second or shoulder tread zone 40 formed of a second rubber compound. The second tread zone 40 is located axially outward of the first or central tread zone 30 on each lateral end of the tire tread 10. The second tread zone 40 extends from a tire tread interface 50 to the shoulder region terminating at the side-wall.

Figure 2:
FIG. 2 is a computer model plot of tire tread wear indicator vs. y-coordinate.

FIG. 2 illustrates a computer simulation of a comprehen-sive wear model illustrating the amount of wear caused by events such as takeoff, landing (touch down) taxing, turning, and braking. As shown in FIG. 2, in the shoulder tread zone 40 at the outer lateral ends of the tire tread 10, there is shown a large increase in wear.

Figure 3:
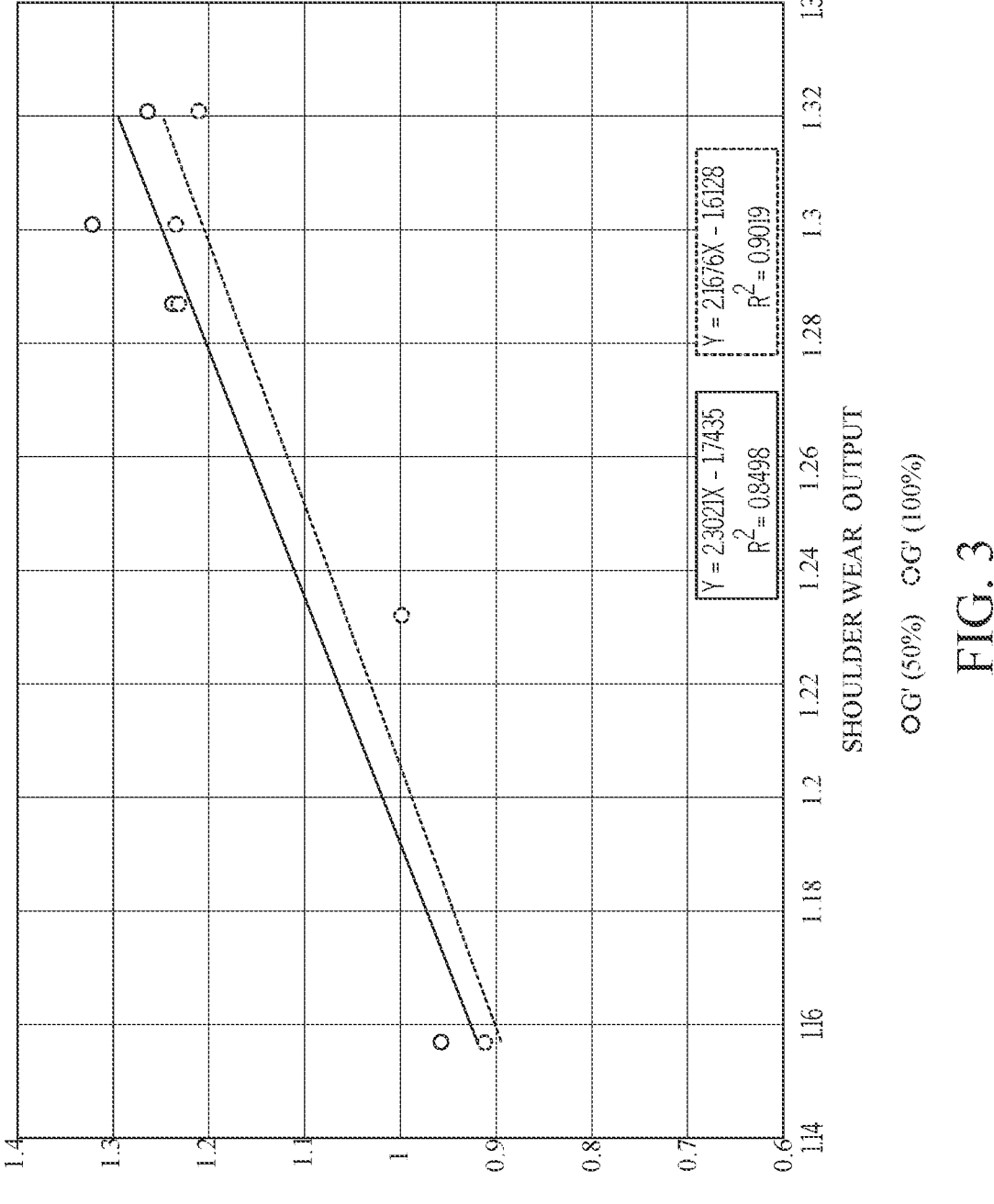
FIG. 3 is a computer model plot of relative G' vs. shoulder wear.

FIG. 3 illustrates that shoulder wear for an aircraft tire correlates strongly with high strain G', or G' (measured at 50%-100% strain) with an $R^2 > 0.8$. G' is the dynamic storage modulus and is a measurement of the viscoelastic properties of rubber compounds at various strain levels. G' may be obtained using a Rubber Process Analyzer as RPA2000™ from the Alpha Technologies. Such measurements are known to those of ordinary skill in the art. These measure-ments are typically made on green rubber. For example, using the RPA2000™, a strain sweep at 100° C. at 1 Hz over a range of from 1% to 100% strain may be made.

Additionally, FIG. 3 illustrates the shoulder wear rate for various compounds having different stiffness levels. FIG. 3 illustrates that the shoulder wear rate is lowest for the softer compounds, i.e., lower G' values at high strain. In one embodiment, G' of the second rubber compound for the shoulder or second tread zone 40 is selected to have a G' (at 100% strain) in the range of 810,000 to 830,000 MPa, and more preferably about 820,000 MPa. In a second embodi-ment, G' of the second rubber compound for the shoulder or second tread zone 40 is selected to have a G' (at 50% strain) in the range of 1.024 to 1.028 MPa, and more preferably about 1.026 MPa.

Figure 4:
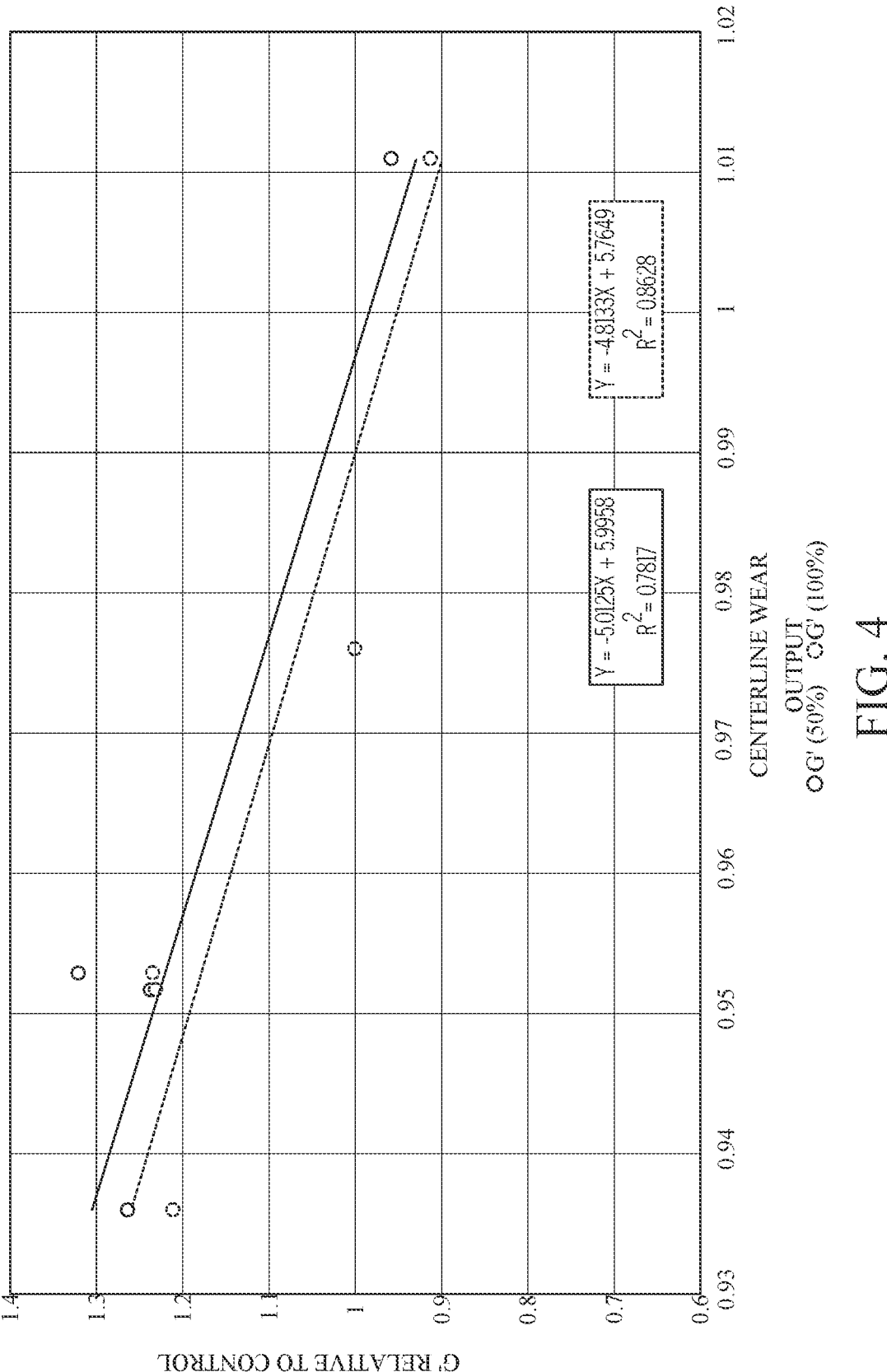
FIG. 4 is a computer model plot of relative G' vs. centerline tread wear.

FIG. 4 illustrates the centerline wear rate for the tire tread 10 versus G' at various strain levels. From FIG. 4, it has been determined that centerline wear correlates strongly with G' at 100% strain. Centerline wear is reduced for compounds higher in stiffness, i.e., higher values of G' (at 100% strain). Thus, for the first or central tread zone 30 it is preferred that the G' (100%) of the first rubber compound be in the range of 1.2 to 1.4 MPA, and more preferably about 1.3 MPA. Additionally, for the first or central tread zone 30 it is preferred that the G' (at 50% strain) of the first rubber compound be in the range of 1.6 to 1.8 MPa, more preferably, about 1.7 MPA.

Figure 5:
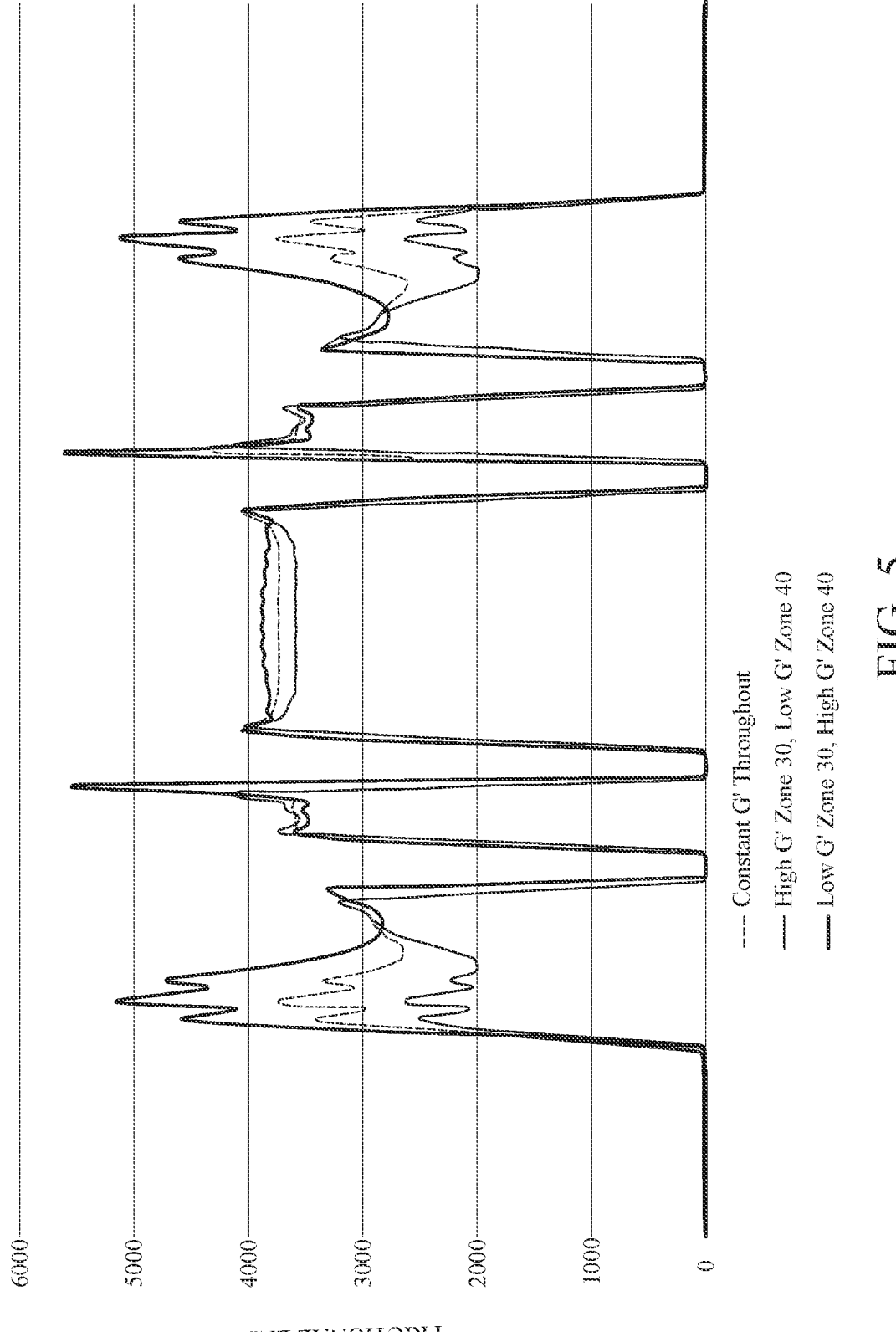
FIG. 5 is a computer model plot of overall wear of the tread having three different zoned tread compositions.

FIG. 5 illustrates the overall wear rate of the tire tread 10 using first and second tread zones 30, 40 for different types of compounds. Thus, tread zoning improves the wear balance of the tire tread 10, while slightly improving centerline tread wear.

Accordingly, in order to improve the overall wear rate of the tire tread 10, it is desired to have a first or central tread zone 30 formed of a first rubber compound having a G' (50%) at least 150% greater than the G' (at 50% strain) of the second rubber compound, and more preferably, at least 170% greater than the G' (at 50% strain) of the second rubber compound.

The first rubber compound is selected to have a greater stiffness than the second rubber compound so as to provide the tread with greater wear resistance along the first or central tread zone 30, and the second rubber compound provides the tread with a softer compound that reduces shoulder wear. The interface 50 or dividing line between the first and second tread zones 30, 40 is determined from modeling analysis such as shown in FIG. 2. As shown in FIG. 5, the tread wear is highest at the outer lateral ends of the tread, and lower in the central portion of the tread. For a typical tire tread, the first or central tread zone 30 is preferably at least 50-70% of the total tread arc width, and the combined outer lateral ends are preferably at least 30-50% of the total tread arc width.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire having a tread with a ground engaging outer surface, the tread having a first tread zone and a second tread zone, wherein the first tread zone includes a central portion of the tread and the second tread zone is located adjacent the first tread zone and on each lateral end of the tread, wherein the first tread zone extends across the central portion of the tread to a tire tread interface that is axially outward of an axially outermost groove and extends substantially perpendicularly to the outer surface of the tread, wherein the second tread zone extends from the tire tread interface to a shoulder region terminating at a sidewall, wherein the first tread zone is formed of a first rubber compound and the second tread zone is formed of a second rubber compound that is different from the first rubber compound, wherein the first tread zone is free of the second rubber compound and the second tread zone is free of the first rubber compound, wherein the first rubber compound has a G' (at 50% strain) at least 150% greater than the G' (at 50% strain) of the second rubber compound, and wherein the G' (at 50% strain) of the first and second rubber compounds is measured at 100° C. at 1 Hz.

2. The pneumatic tire of claim 1 wherein the first rubber compound has a G' (at 50% strain) at least 170% greater than the G' (at 50% strain) of the second rubber compound.

3. The pneumatic tire of claim 1 wherein the axial width of the first tread zone is in the range of 50-70% of a width of the tread.

4. The pneumatic tire of claim 1 wherein the first rubber compound has a G' (at 50% strain) in the range of 1.6 to 1.8 MPa.

5. The pneumatic tire of claim 4 wherein the first rubber compound has a G' (at 50% strain) of 1.7 MPa.

6. The pneumatic tire of claim 1 wherein the second rubber compound has a G' (at 50% strain) of 1.024 to 1.028 MPa.

7. The pneumatic tire of claim 6 wherein the second rubber compound has a G' (at 50% strain) of 1.026 MPa.

8. A pneumatic tire having a tread with a ground engaging outer surface, the tread having a first tread zone and a second tread zone, wherein the first tread zone includes a central portion of the tread and the second tread zone is located adjacent the first tread zone and on each lateral end of the tread, wherein the first tread zone is formed of a first rubber compound and the second tread zone is formed of a second rubber compound that is different from the first rubber compound, wherein the first tread zone is free of the second rubber compound and the second tread zone is free of the first rubber compound, wherein the first tread zone extends across the central portion of the tread to a tire tread interface that is axially outward of an axially outermost groove and extends substantially perpendicularly to the outer surface of the tread, wherein the second tread zone extends from the tire tread interface to a shoulder region terminating at a sidewall, wherein the first rubber compound has a G' (at 50% strain) at least 170% greater than the G' (at 50% strain) of the second rubber compound, and wherein the G' (at 50% strain) of the first and second rubber compounds is measured at 100° C. at 1 Hz.

9. The pneumatic tire of claim 8 wherein the first rubber compound has a G' (at 50% strain) of 1.6 to 1.8 MPa.

10. The pneumatic tire of claim 9 wherein the first rubber compound has a G' (at 50% strain) in the range of 1.7 MPa.

11. The pneumatic tire of claim 8 wherein the second rubber compound has a G' (at 50% strain) of 1.024 to 1.028 MPa.

12. The pneumatic tire of claim 11 wherein the second rubber compound has a G' (at 50% strain) of 1.026 MPa.

13. The pneumatic tire of claim 8 wherein an arc width of the first tread zone is at least 50-70% of a total tread arc width.

14. The pneumatic tire of claim 13 wherein the arc width of the first tread zone is at least 70% of a total tread arc width.

15. A pneumatic tire having a tread with a ground engaging outer surface, the tread having a first tread zone and a second tread zone, wherein the first tread zone includes a central portion of the tread and the second tread zone is located adjacent the first tread zone and on each lateral end of the tread, wherein the first tread zone is formed of a first rubber compound and the second tread zone is formed of a second rubber compound that is different from the first rubber compound, wherein the first tread zone is free of the second rubber compound and the second tread zone is free of the first rubber compound, wherein the first tread zone extends across the central portion of the tread to a tire tread interface that is axially outward of an axially outermost groove and extends substantially perpendicularly to the outer surface of the tread, wherein the second tread zone extends from the tire tread interface to a shoulder region terminating at a sidewall, wherein the second rubber compound has a G' (at 50% strain) in the range of 1.024 to 1.028 MPa, and wherein the first rubber compound has a G' (at 50% strain) at least 150% greater than the G' (at 50% strain) of the second rubber compound, and wherein the G' (at 50% strain) of the first and second rubber compounds is measured at 100° C. at 1 Hz.

16. The pneumatic tire of claim 15 wherein the second rubber compound has a G' (at 50% strain) of 1.026 MPa.

17. The pneumatic tire of claim 15 wherein an arc width of the first tread zone is at least 50-70% of a total tread arc width.

18. The pneumatic tire of claim 15 wherein the first rubber compound has a G' (at 50% strain) of 1.6 to 1.8 MPa.

19. The pneumatic tire of claim 18 wherein the first rubber compound has a G' (at 50% strain) in the range of 1.7 MPa.

* * * * *